United States Patent [19]
Claypoole

[11] 4,037,922
[45] July 26, 1977

[54] OPTICAL WAVEGUIDE CABLE

[75] Inventor: Stewart A. Claypoole, Painted Post, N.Y.

[73] Assignee: Corning Glass Works, Corning, N.Y.

[21] Appl. No.: 593,285

[22] Filed: July 7, 1975

[51] Int. Cl.² .............................................. G02B 5/16
[52] U.S. Cl. .................................................. 350/96 B
[58] Field of Search ............. 350/96 B, 96 WG, 96 R

[56] References Cited

U.S. PATENT DOCUMENTS

| | | | |
|---|---|---|---|
| 3,641,332 | 2/1972 | Reick ................................... | 350/96 M |
| 3,865,466 | 2/1975 | Slaughter .............................. | 350/96 B |
| 3,887,265 | 6/1975 | Margolis et al. .................... | 350/96 B |

*Primary Examiner*—John K. Corbin
*Assistant Examiner*—Rolf Hille

*Attorney, Agent, or Firm*—Walter S. Zebrowski; Clarence R. Patty, Jr.

[57] ABSTRACT

An optical waveguide cable is disclosed wherein a bundle of waveguide fibers is formed from a plurality of individual fibers coated with a release agent. The fiber bundle is encapsulated within an encapsulating material in which at least two strength members are embedded. The strength members are disposed parallel to the bundle in a plane substantially through the longitudinal axis of the bundle, at least one of the strength members being disposed in the plane on one side of the bundle while the remaining strength members are disposed in the plane on the other side of the bundle. Each of the waveguide fibers may be coated with a protective layer of a synthetic resinous material applied over the release agent before the bundle is formed.

18 Claims, 11 Drawing Figures

OPTICAL WAVEGUIDE CABLE

BACKGROUND OF THE INVENTION

The present invention relates to cable construction but in particular to optical waveguide cable construction, the optical waveguides being formed of glass or similar fibers.

Optical waveguides are a relatively new development and no significant commercial use has taken place to date. In view of this, optical waveguide cable construction is a new art. Some of the problems encountered in optical waveguide cable construction are set out in the following. To provide useful optical waveguides, signal attenuation must be maintained low and preferably below about 10 db/kilometer. Optical waveguides transmit visible or invisible light. In transmission, such light signals are readily attenuated in response to relatively small distortions of the optical waveguide. For example, relatively sharp bends, or a rough adjacent surface may produce sufficient distortion within the optical waveguide to result in totally unacceptable signal attenuation. Similarly, transverse or longitudinal stresses imposed upon the optical waveguide fibers during cable manufacture or inherent in the resulting structure may produce totally unacceptable signal attenuation in the resulting cable. These and many other problems have been encountered in producing an acceptable optical waveguide cable. In view of this, prior art cable manufacture, that is manufacture of metallic or the like cables, has been found to be unacceptable.

For a better understanding of optical waveguide fibers and their manufacture, reference is made to the following U.S. patents: U.S. Pat. No. 3,659,915 issued to R. D. Maurer and P. C. Schultz; U.S. Pat. No. 3,711,262 issued to D. B. Keck and P. C. Schultz; U.S. Pat. No. 3,737,292 issued to D. B. Keck, P. C. Schultz and F. Zimar; U.S. Pat. No. 3,775,075 issued to D. B. Keck and R. D. Maurer; and U.S. Pat. No. 3,823,995 issued to L. L. Carpenter.

SUMMARY OF THE INVENTION

The objects of the present invention are to provide an optical waveguide cable which does not increase signal attenuation through the optical waveguide fibers or maintains such increase in signal attenuation to a negligible level, provides ease of construction, permits long cable life, provides cable strength while maintaining a desired degree of flexibility, and permits economic construction. In addition, it is an object of this invention to provide an optical waveguide cable which maintains the relatively fragile optical waveguide fibers in such a manner as to prevent breakage.

Broadly, according to the present invention, an optical waveguide cable is provided having a plurality of optical waveguide fibers disposed in a substantially contiguous relationship to form a bundle. A coating of release agent is applied to the exterior surface of the fibers and an encapsulating coating is disposed surrounding the bundle of coated fibers. At least two strength members are embedded in the encapsulating coating and are disposed parallel to the bundle of fibers in a plane substantially through the longitudinal axis of the bundle. At least one of the strength members is disposed in such plane on one side of the bundle while the balance of the strength members are disposed in the same plane on the opposite side of the bundle. A protective layer surrounds each fiber of the fiber bundle, the protective layer being a synthetic resinous material disposed over the coating of the release agent.

Additional objects, features and advantages of the present invention will become apparent to those skilled in the art from the following detailed description and the attached drawings on which, by way of example, only the preferred embodiments of this invention are illustrated.

DETAILED DESCRIPTION

Figure 1:
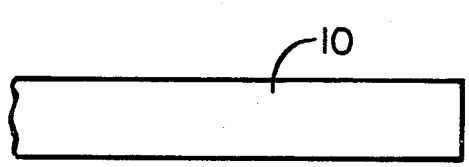
FIG. 1 is a fragmentary elevation view of a typical optical waveguide fiber.

It is to be noted that the figures of the drawing are illustrative and symbolic of the invention, and there is no intention to indicate scale or relative proportion of the elements shown therein.

Referring to FIG. 1 there is shown a typical optical waveguide fiber 10 constructed by, for example, any of the methods described in the heretofore noted U.S. patents. Operational theories and other pertinent information concerning lenses and optical waveguides may be found in "Solutions of Two Optical Problems" by A. Fletcher, T. Murphy and A. Yound, Proc. Roy., Society (London) Volume 223, pages 216-225, 1954; "Geometrical Optics of Parabolic Index-Gradient Cylindrical Lenses" by F. P. Kapron, Journal of the Optical Society of America, Volume 60, No. 11, pages 1433-1436, November 1970; U.S. Pat. No. 3,157,726 issued to Hicks et al.; the publication entitled "Cylindrical Dielectric Waveguide Mode" by E. Snitzer, Journal of the Optical Society of America, Volume 51, No. 5, pages 491-498, May 1961; and in "Fiber Optics Principles and Applications" by N. S. Kapany, Academic Press, 1967.

Figure 2:
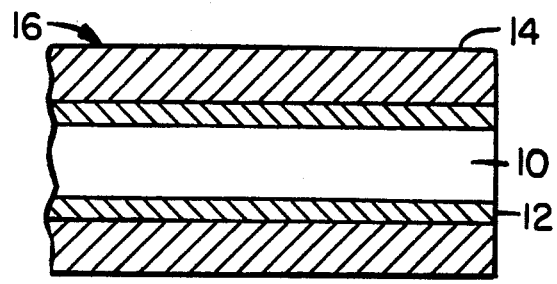
FIG. 2 is a fragmentary cross-sectional view of a buffered optical waveguide fiber.

Referring now to FIG. 2, the first step towards producing the optical waveguide cable of the present invention are illustrated. To the exterior longitudinal surface of fiber 10, a coating 12 of a release agent is applied by spraying, pulling the fiber through a pool of liquid, passing the fiber over a moistened wick, pulling the fiber through a coating die, or the like methods. A thin protective layer 14 is applied over the release agent. For the purposes of the present application, an optical waveguide fiber with a coating of release agent and a protective layer as hereinabove described will be referred to herein as a buffered fiber. The release agent material may be any suitable lubricant such as silicone oil, petroleum lubricants, a layer of colloidal graphite, talc, or the like. The protective layer material may be polyvinyl chloride, neoprene, teflon, polyurethane, nylon, or the like. The protective layer material should be one having a low Young's modulus and both it as well as the release agent should be materials which are compatible with each other and with the optical waveguide material.

Figure 3:
FIG. 3 is a fragmentary elevational view of a bundle of buffered optical waveguide fibers.
Figure 4:
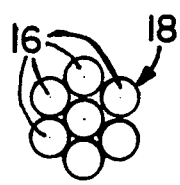
FIG. 4 is an end view of the fiber bundle of FIG. 3.

Referring to FIGS. 3 and 4, there is shown a plurality of buffered optical waveguide fibers 16 clustered together in a substantially contiguous relationship to form an optical waveguide fiber bundle 18. The buffered optical waveguide fibers 16 may be aligned in the bundle in a substantially parallel relationship as illustrated in FIGS. 3 and 4, or may be stranded, as for example, a wire would be stranded. A typical lay may be 360° per foot of length.

Figure 5:
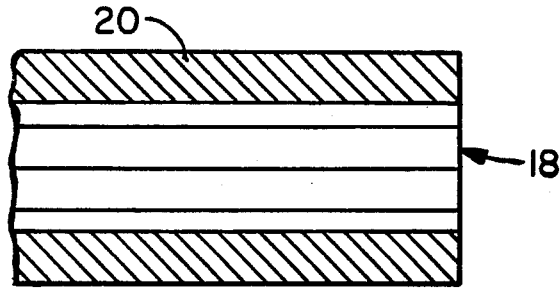
FIG. 5 is a fragmentary cross-sectional view of the optical waveguide fiber bundle of FIG. 3 to which the first layer of an encapsulating coating has been applied.

The optical waveguide fiber bundle 18 so constructed is then encapsulated within a first layer 20 of an encapsulating coating as illustrated in FIG. 5. A second encapsulating coating layer 22 is then applied over first encapsulating coating layer 20, within which second layer at least two strength members 24 are embedded. The two strength members 24 are disposed parallel to bundle 18 in a plane substantially through the longitudinal axis of bundle 18. One of strength members 24 is disposed in the plane on one side of bundle 18 while the other strength member 24 is disposed in the plane on the other side of fiber bundle 18 as illustrated in FIGS. 6 and 7.

Figure 6:
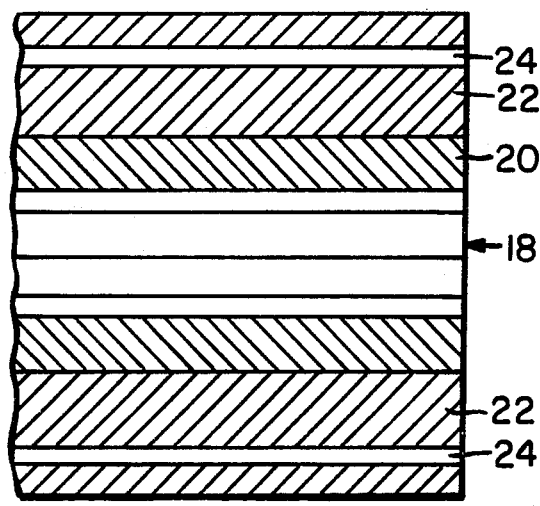
FIG. 6 is a fragmentary cross-sectional view of the optical waveguide fiber bundle of FIG. 5 to which a second layer of an encapsulating coating and strength members have been added.
Figure 7:
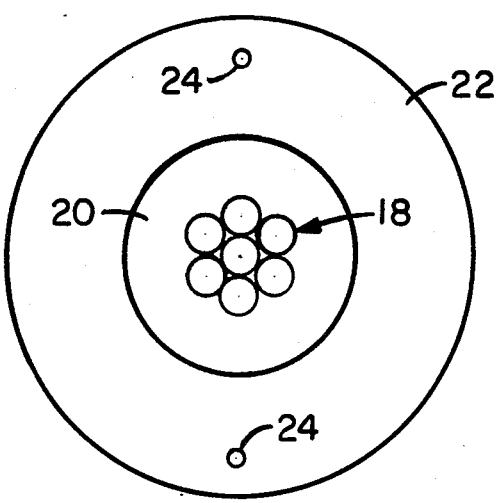
FIG. 7 is an end view of the optical waveguide cable of FIG. 6.
Figures 8, 9:
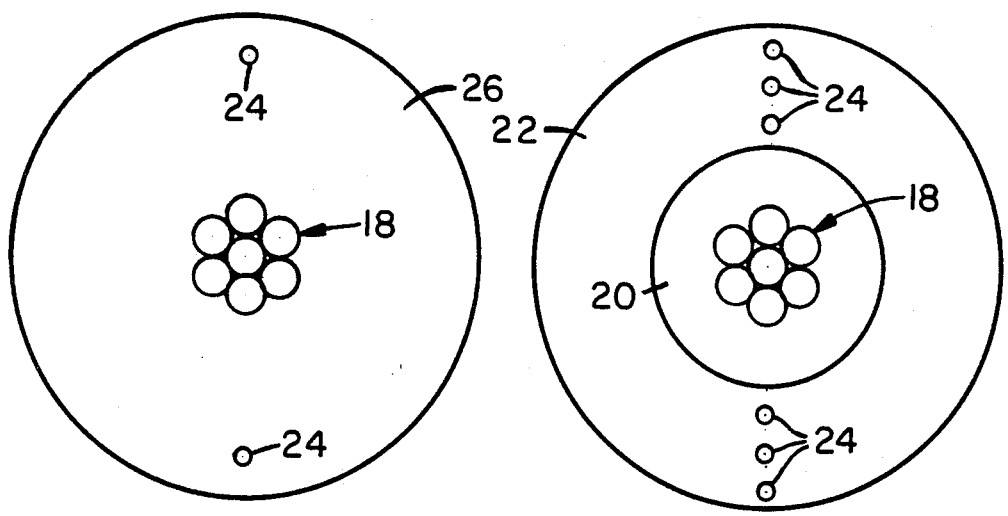
FIG. 8 is an end view of another embodiment of an optical waveguide cable.
FIG. 9 is an end view of still another embodiment of an optical waveguide cable.

The embodiment illustrated in FIGS. 5, 6, and 7 shows the encapsulating coating to be applied in two layers 20 and 22. Referring now to FIG. 8, it can be seen that another embodiment of this invention comprises encapsulating bundle 18 and a single layer 26 of an encapsulating coating within which the two strength members are disposed in a manner as heretofore described.

The material of encapsulating coating of layers 20, 22 and 26 may be of the same material as described hereinabove in connection with protective layer 14. It will be understood that the material of the encapsulating coating of layers 20, 22 and 26 need not be the same material as that used for protective layer 14 but may be any combination of the materials described in connection therewith. The only requirement is that all of the materials be compatible, chemically or otherwise, with each adjacent material and the material of the optical waveguide fibers. The material of the strength member may be a high Young's modulus material such as an aromatic polyamide known as Kevlar-49, an aramid, manufactured by the E. I. dupont de Nemours and Company, Inc. of Wilmington, Delaware. Other suitable materials for the strength member are steel, both solid and braided; fiberglass; or the like. A requirement of the strength member is that it have high tensile strength and that it not stretch significantly under load.

Referring to FIG. 9, there is illustrated still another embodiment of the present invention wherein more than one strength member 24 is illustrated on each side of fiber bundle 18 disposed parallel to fiber bundle 18 in a plane substantially through the longitudinal axis of bundle 18 as heretofore described. The embodiment of FIG. 9 shows the encapsulating coating to be in two layers 20 and 22, however, it may be formed in one layer as described in connection with coating 26 of FIG. 8. Although it is preferred to have an equal number of strength members 24 on each side of fiber bundle 18 for balance, it is not necessary that this be so as long as at least one strength member is disposed on each side.

Figure 10:
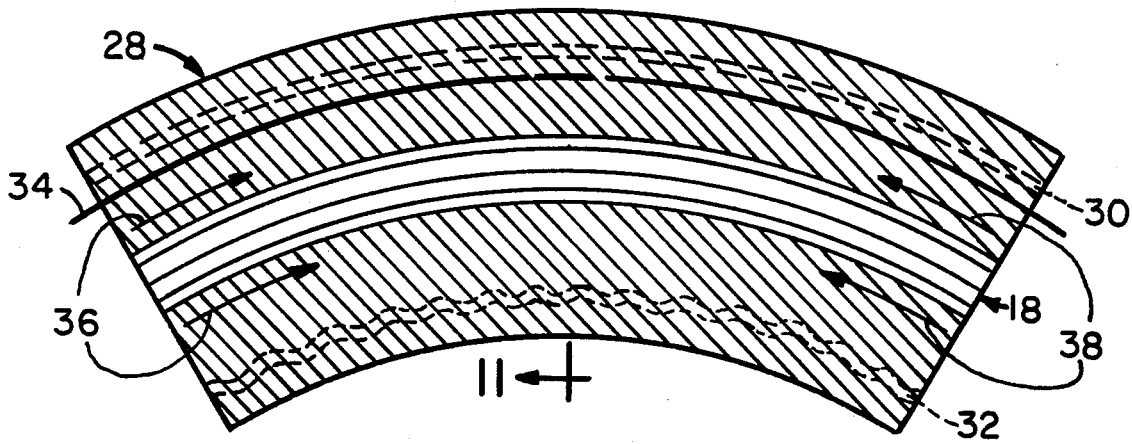
FIG. 10 is a fragmentary cross-sectional view of a bent optical waveguide cable.
Figure 11:
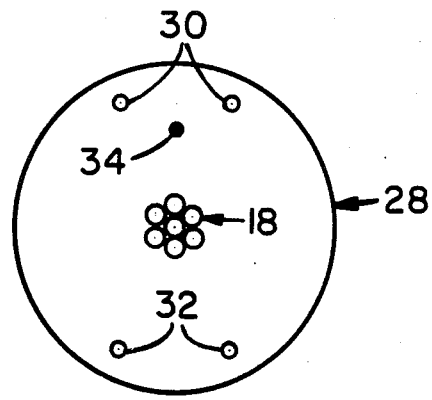
FIG. 11 is a cross-sectional view of the cable of FIG. 10 taken along lines 11—11.

The importance of aligning strength members in one plane as illustrated in the drawings is as follows. Since the strength members are required to have a high Young's modulus and therefore have low elasticity, the encapsulated optical waveguide cable heretofore described will be readily bendable about an axis through the strength members and the fiber bundle, but will be substantially more rigid and less bendable in any other direction. Therefore, when handling the encapsulated optical waveguide cable it will be bendable about axes which pass through all of the strength members and the fiber bundle resulting in the fiber bundle being substantially unstressed during any such handling. On the other hand, should the strength members be disposed in any position with respect to the fiber bundle other than in substantially one plane as described, and parallel to the fiber bundle, or along the longitudinal axis of the bundle, the bending axis of the encapsulated optical waveguide cable would not pass through the fiber bundle, rather would be above or below it as illustrated in FIGS. 10 and 11. In such an embodiment, four strength members are illustrated at about 90° apart. In bending this very rigid cable 28 as illustrated in FIG. 10, it is found that the upper strength members 30 substantially do not yield since they are put in tension while lower strength members 32 in effect collapse like a string since they have little compressive strength. In such an embodiment, it is seen that the encapsulated cable no longer bends about an axis which passes through fiber bundle 18 rather bends about an axis which is significantly higher in the structure such as is illustrated by axis 34. This results in everything above axis 34 being in tension and everything below axis 34 being in compression, including optical fiber bundle 18. The compressive forces on optical fiber bundle 18 are illustrated by arrows 36 and 38. Such compressive forces cause distortions in the optical waveguide fibers of bundle 18, which distortions produce undesirably high signal attenuations.

A typical example of the present invention is as follows. A plurality of individual optical waveguide fibers were produced in accordance with the methods taught in U.S. Pat. No. 3,823,995 issued to L. L. Carpenter. Each of the fibers were then passed through a reservoir containing Dow-Corning 200 silicone oil produced by the Dow-Corning Corporation of Midland, Michigan, the silicone oil having a viscosity of 20 CS. In this manner, a film of the silicone oil was applied to the exterior longitudinal surfaces of the fiber to form a coating of release agent. Immediately thereafter, a 0.002 inch thick protective layer was extruded over the layer of release agent to form a buffered optical fiber. The protective layer material was Roylar E-9, a 90 Shore A polytetramethylene-etherglycol based thermoplastic, commonly referred to as a polyurethane elastoplastic. This material has a Young's modulus of 1200 psi at 100 percent elongation and a specific volume of 24.3 in.$^3$/lb., and is produced by Uni-Royal Chemical, Division Uni-Royal, Inc., of Naugatuck, Connecticut.

Six such buffered optical fibers were disposed in a substantially contiguous relationship with one another around a central buffered optical fiber to form an optical waveguide bundle 18 as is illustrated in the drawings. A first layer of an encapsulating coating of Roylar E-9 was then extruded surrounding the optical waveguide bundle so formed. This first layer of encapsulating coating had a thickness of 0.020 inch. Two strength members were then disposed parallel to the optical waveguide bundle in a plane substantially through the longitudinal axis of the bundle. One of such strength members were disposed in this plane on each side of the optical waveguide bundle. The strength members were formed of an aromatic polyamide having a density of 0.050 lbs./in.$^3$, tensile strength of 240,000 psi, Young's Modulus of 11.0 × 10$^6$ psi, interlaminar shear strength of 10,000 psi, coefficient of thermal expansion of $-2 \times 10^{-6}$in./in.° C., and a dielectric strength of 500 v/mil. Such an aromatic polyamide is available as Kevlar 49 and is produced by the E. I. dupont de Nemours & Co., of Wilmington, Delaware. These strength members had a nominal cross-sectional dimension of 0.038 inch. A second layer of an encapsulating coating of Roylar E-9 was then extruded over the first layer simultaneous with the disposition of the two strength members embedding the two strength members therein resulting in a structure as illustrated in FIGS. 6 and 7 of the drawings.

The optical waveguide cable so formed was subjected to a tensile load of 200 pounds and a bending curvature of one-half inch radius under a load of 5 pounds. Under such testing, the individual optical waveguide fibers as well as the optical waveguide bundle of fibers remained unbroken. The signal attenuation did not significantly change as a result of such loading.

Although the present invention has been described with respect to specific details of certain embodiments thereof, it is not intended that such details be limitations upon the scope of the invention except insofar as set forth in the following claims.

I claim:

1. A substantially circular optical waveguide cable comprising:
    a plurality of optical waveguide fibers disposed in a substantially contiguous relationship to form a single concentrically arranged fiber bundle,
    an encapsulating coating of at least one layer surrounding said single bundle of fibers, and
    at least two strength members embedded in said encapsulating coating and disposed parallel to said single bundle in a plane substantially along a diameter of said single bundle through the longitudinal axis of said bundle, at least one of said strength members being disposed in said plane on one side of said single bundle, the remainder of said strength members being disposed in said plane on the other side of said single bundle, each strength member on said one side of said single bundle being disposed at a distance from said longitudinal axis of said single bundle substantially equal to the distance therefrom of the corresponding strength member on said other side of said single bundle, said strength members on said one side of said single bundle being disposed adjacent each other and said strength members disposed on said other side of said single bundle being disposed adjacent each other when a plurality of strength members are disposed on either or both of said sides.

2. The optical waveguide bundle of claim 1 embodying two strength members, one of said strength members being disposed in said plane on one side of said bundle, the other of said strength members being disposed in said plane on the other side of said bundle, said strength members being disposed substantially equidistant from said longitudinal axis of said bundle of fibers.

3. The optical waveguide cable of claim 1 further comprising a coating of release agent applied to the exterior surface of said fibers.

4. The optical waveguide cable of claim 3 wherein said release agent is silicone oil.

5. The optical waveguide cable of claim 3 further comprising a protective layer surrounding each fiber of said bundle, said protective layer being disposed over said coating of release agent.

6. The optical waveguide cable of claim 5 wherein said protective layer is formed of a synthetic resinous material.

7. The optical waveguide cable of claim 1 wherein said encapsulating coating is formed of a synthetic resinous material.

8. The optical waveguide cable of claim 7 wherein said synthetic resinous material is a polytetramethylene-etherglycol based thermal plastic.

9. The optical waveguide cable of claim 7 wherein said protective layer is formed of a synthetic resinous material.

10. The optical waveguide cable of claim 9 wherein each said synthetic resinous material is a polytetramethylene-etherglycol based plastic.

11. The optical waveguide cable of claim 10 further comprising a coating of release agent applied to the exterior surface of said fibers.

12. The optical waveguide cable of claim 11 wherein said release agent is silicone oil.

13. The optical waveguide cable of claim 12 wherein said strength members are formed of an aromatic polyamide.

14. The optical waveguide cable of claim 1 wherein said strength members are formed of an aromatic polyamide.

15. The optical waveguide cable of claim 5 wherein each said encapsulating coating and said protective layer is formed of a synthetic resinous material, said cable embodying two strength members, one of said strength members being disposed within said plane on one side of said bundle, the other of said strength members being disposed in said plane on the other side of said bundle, such strength members being disposed substantially equidistant from the longitudinal axis of said bundle of fibers.

16. The optical waveguide cable of claim 15 wherein said synthetic resinous material is polytetramethylene-etherglycol based thermal plastic and said strength members are an aromatic polyamide.

17. The optical waveguide cable of claim 1 wherein said single concentrically arranged fiber bundle is stranded.

18. The optical waveguide cable of claim 1 wherein said encapsulating coating is formed of a first layer surrounding said single bundle and a second layer overlaying said first layer, said strength members being disposed only within said second layer.

* * * * *